Jan. 8, 1935.  H. R. SCHUTZ  1,987,129
METHOD OF AND APPARATUS FOR GATHERING GLASS
Filed Nov. 13, 1931  6 Sheets-Sheet 1
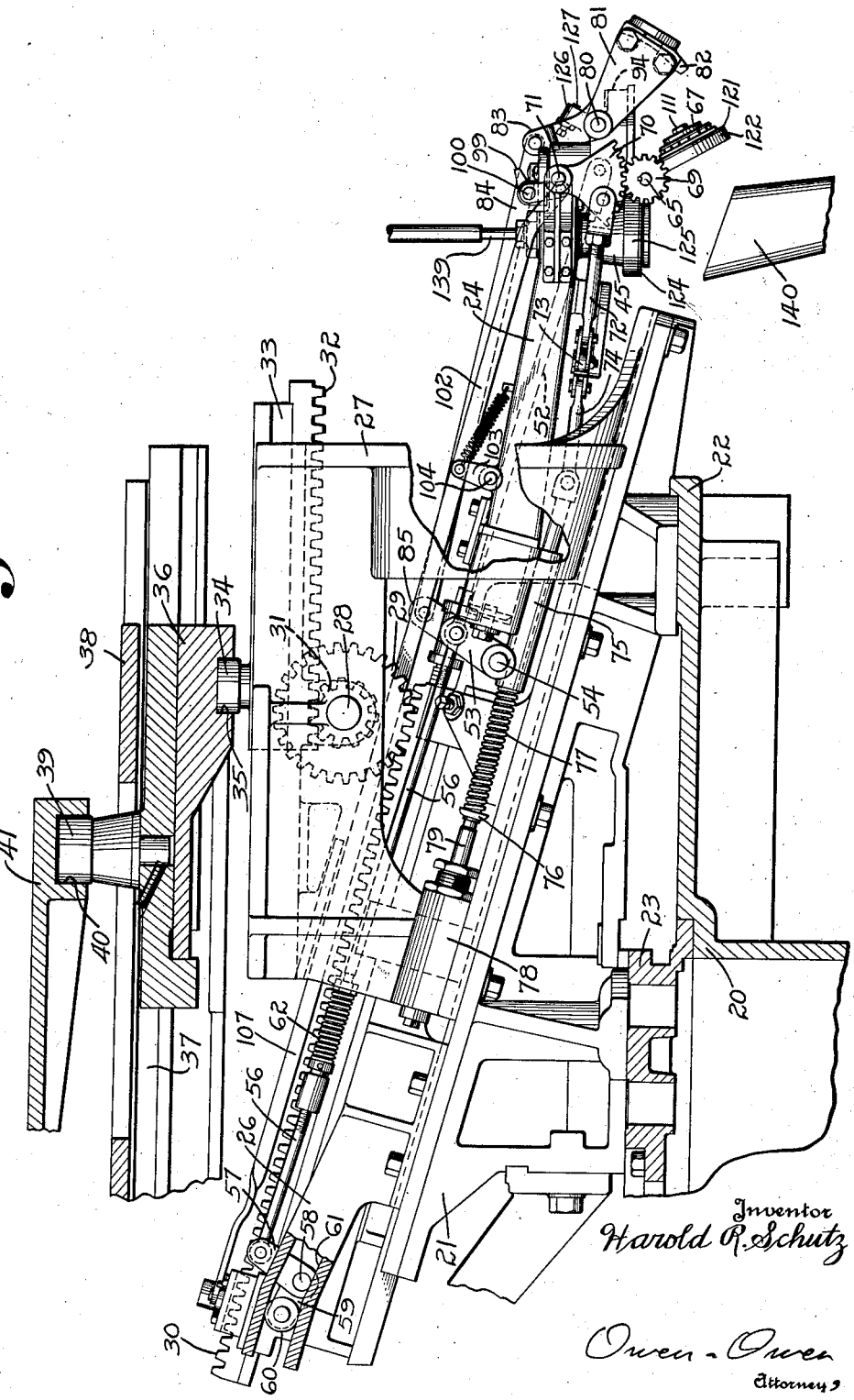

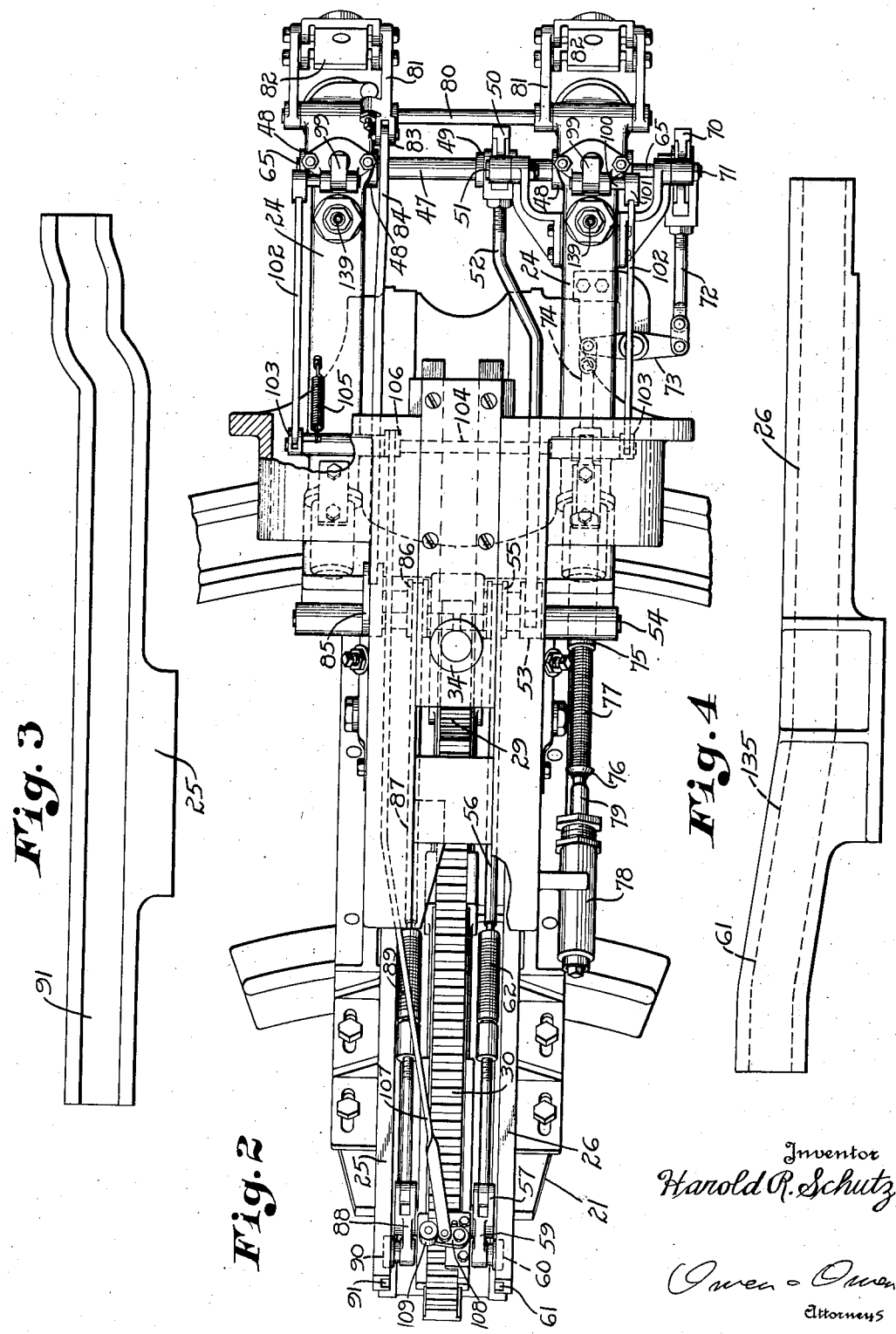

Jan. 8, 1935.  H. R. SCHUTZ  1,987,129
METHOD OF AND APPARATUS FOR GATHERING GLASS
Filed Nov. 13, 1931  6 Sheets-Sheet 3
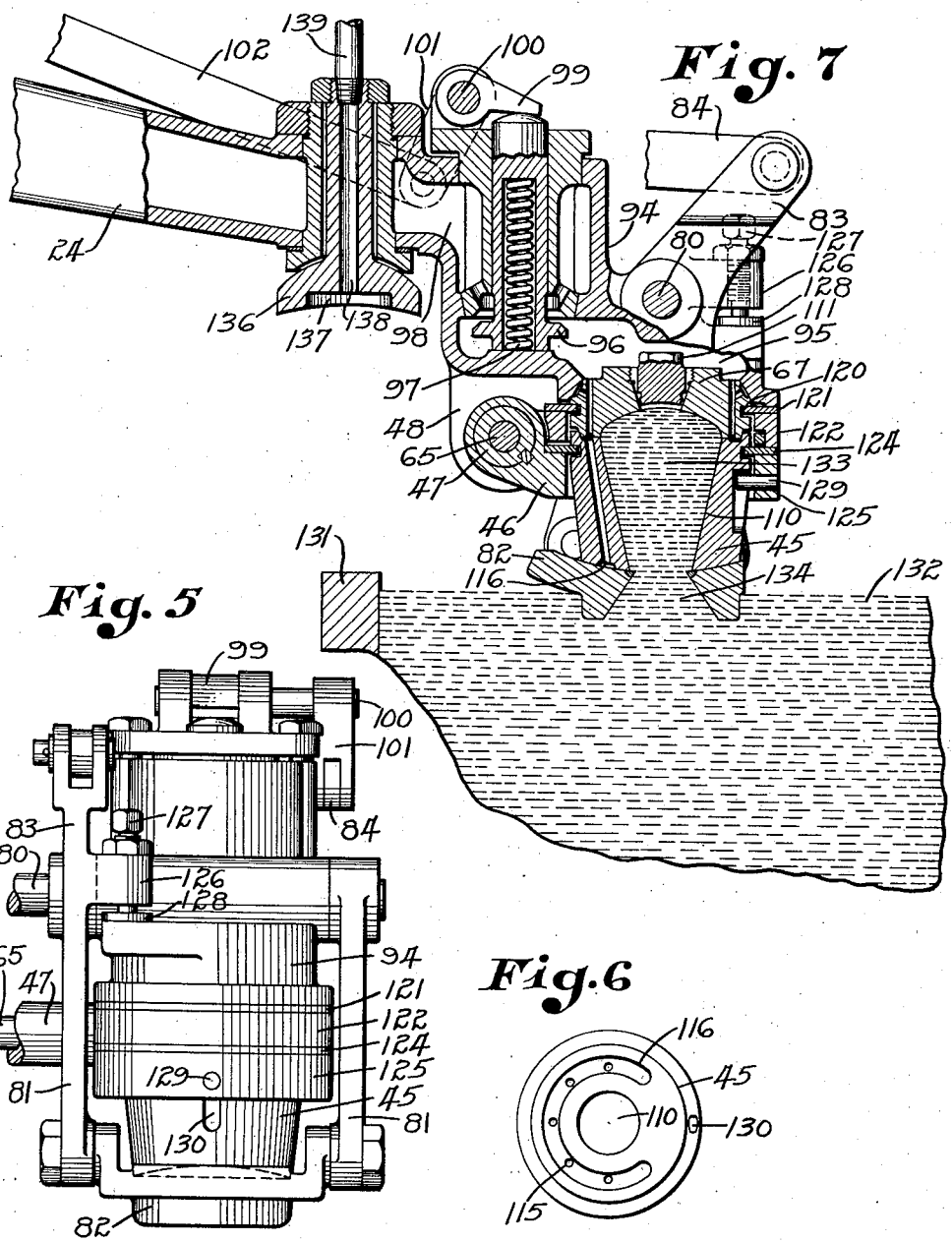
Inventor
Harold R. Schutz
By Owen - Owen
Attorneys Jan. 8, 1935.  H. R. SCHUTZ  1,987,129
METHOD OF AND APPARATUS FOR GATHERING GLASS
Filed Nov. 13, 1931  6 Sheets-Sheet 4

Inventor
Harold R. Schutz
By Owen & Owen
Attorneys

Jan. 8, 1935.  H. R. SCHUTZ  1,987,129
METHOD OF AND APPARATUS FOR GATHERING GLASS
Filed Nov. 13, 1931  6 Sheets-Sheet 5
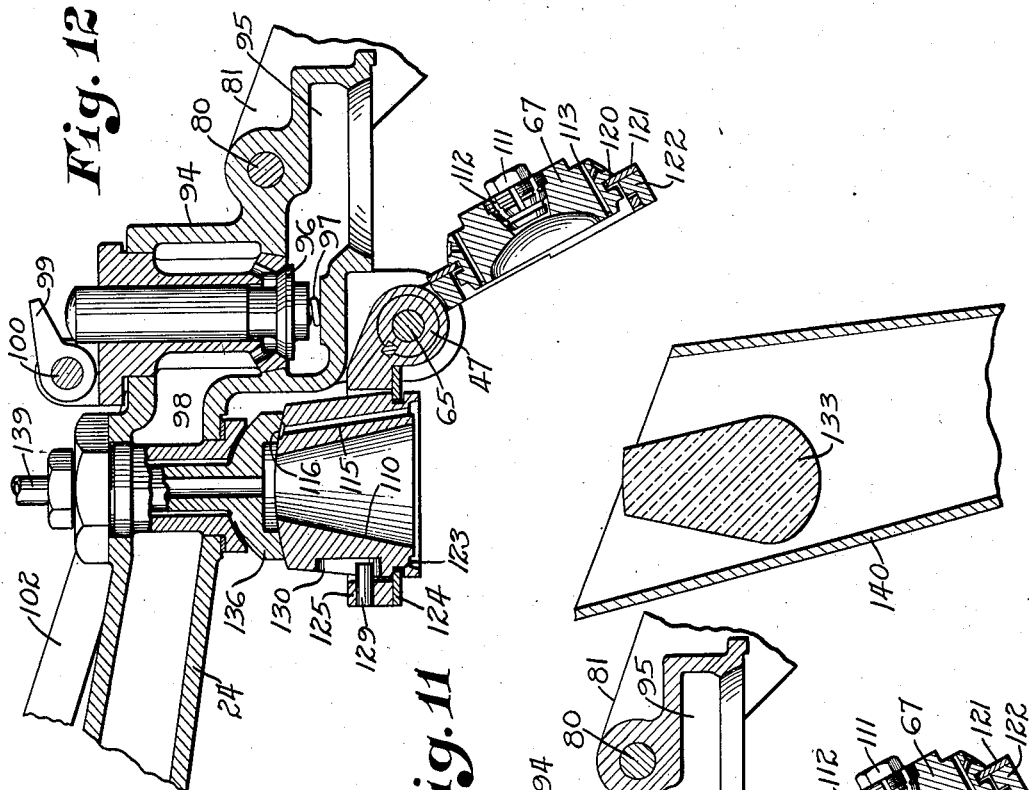
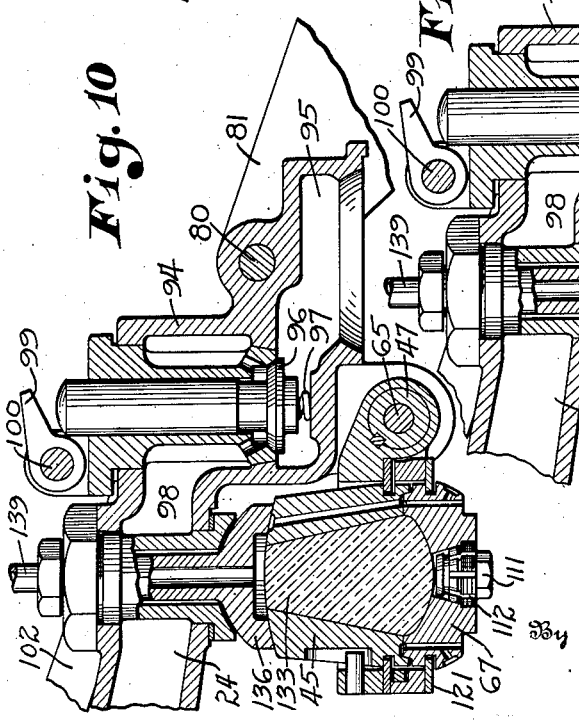
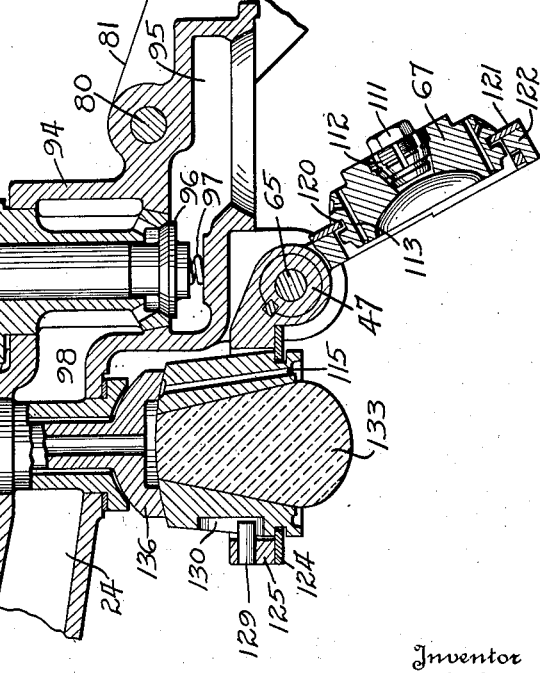
Inventor
Harold R Schutz
By Owen & Owen
Attorneys Jan. 8, 1935.  H. R. SCHUTZ  1,987,129
METHOD OF AND APPARATUS FOR GATHERING GLASS
Filed Nov. 13, 1931  6 Sheets-Sheet 6
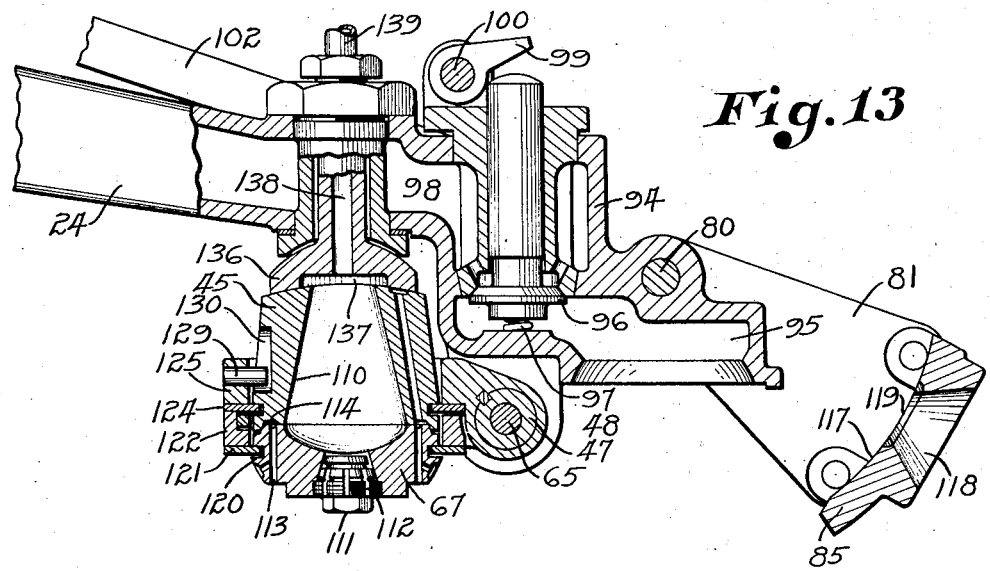
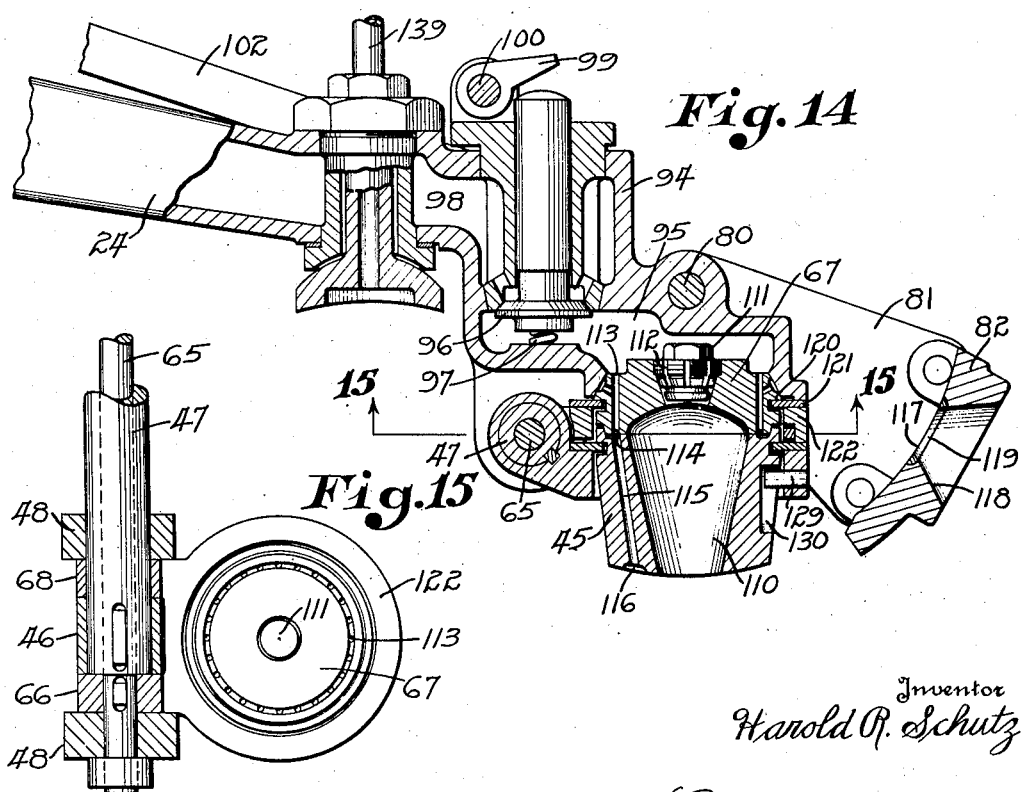
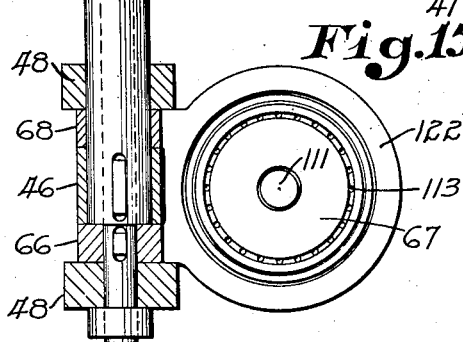
Inventor
Harold R. Schutz
By Owen & Owen
Attorneys Patented Jan. 8, 1935

1,987,129

UNITED STATES PATENT OFFICE 1,987,129

METHOD OF AND APPARATUS FOR GATHERING GLASS

Harold R. Schutz, Toledo, Ohio, assignor to The Libbey Glass Manufacturing Company, Toledo, Ohio, a corporation of Ohio Application November 13, 1931, Serial No. 574,699

6 Claims. (Cl. 49—62)

This invention relates to a method of and apparatus for gathering glass and discharging it into molds. The object of the invention is to provide a method and apparatus whereby the glass may be gathered in exactly measured quantities and delivered to molds in proper condition for forming into glass articles. Minor objects and details of the invention will appear as the description proceeds.

In the accompanying drawings forming a part of this specification—

Figure 1 is a side elevation of the apparatus embodying the invention;

Figure 2 is a plan view of a portion of the apparatus shown in Fig. 1;

Figures 3 and 4 are details of cams included in the apparatus;

Figure 5 is an end view of the gathering head of the apparatus;

Figure 6 is a bottom view of the gathering mold;

Figure 8:
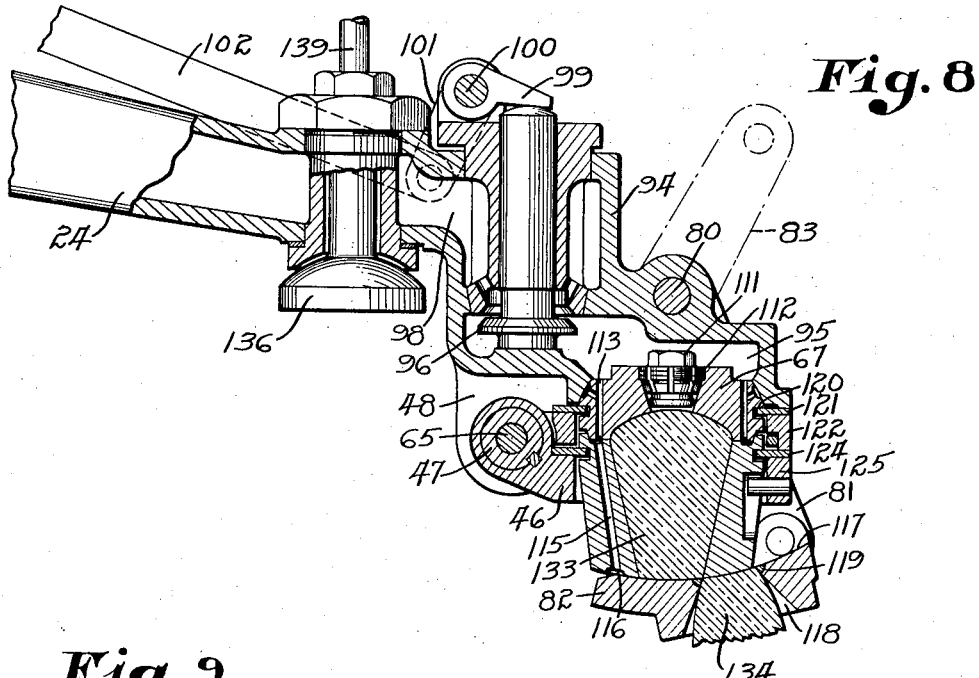

Figures 7 to 14 inclusive are somewhat diagrammatic views illustrating the successive positions of the apparatus; and Figure 15 is a section on line 15—15 of Fig. 14.

While some features of the invention may be employed with differently constructed devices, the invention is illustrated as being used in connection with apparatus similar to that shown in Kadow Patent No. 1,527,556, issued February 24, 1925.

As shown in Fig. 1, there is a turret 20 which is preferably rotated continuously, and which carries suitable glass forming devices, not shown. Mounted on this turret there is a ram guide 21 which is supported on guideways 22 and 23 on the turret, so that the turret may move beneath the ram guide. Mounted in the guideway there is a gathering ram 24.

The ram guide has mounted at one side thereof a cam plate 25, shown in elevation in view 3, and on the other side there is a cam plate 26, shown in elevation in Fig. 4. The ram guide also has mounted thereon brackets 27 in which is mounted a shaft 28 carrying a gear 29 in mesh with a rack 30 on the ram. Shaft 28 also carries a smaller gear 31 which is in mesh with a rack 32 on a plate 33 which slides between brackets 27. On the upper side of plate 33 there is mounted a roller 34 operating in a groove 35 in a plate 36 which slides in a guideway 37 in a stationary plate 38. Plate 36 likewise carries a roller 39 which enters a cam groove 40 in a cam plate 41 which is rotated by any suitable means so as to operate slide 36 and thereby impart motion to slide 33, and through the racks and gears, to the ram.

Mounted in the projecting end of the ram there are two gathering molds 45 with associated parts. Inasmuch as these gathering molds with the associated parts are duplicates of each other, only one will be described in detail. Projecting from gathering mold 45 there is an arm 46 keyed upon an operating sleeve 47 mounted in bearings 48 depending from the ram. Sleeve 47 carries a gear 49 in mesh with a gear segment 50 pivoted on the ram at 51. From segment 50 a rod 52 extends to an arm 53 on a rock shaft 54. Another arm 55 on rock shaft 54 is connected by rod 56 to one arm 57 of a bell crank lever pivoted at 58 on the ram. The other arm 59 of the bell crank lever carries a roller 60 which operates in cam groove 61 of plate 26. A yielding connection 62 may be provided in rod 56.

Within sleeve 47 there is a shaft 65, the end of the shaft extending beyond the end of the sleeve. On the end of shaft 65 there is keyed an ear 66 attached to the cap 67 of the gathering mold. The cap is provided with another ear 68 which is pivoted upon sleeve 47. On the end of shaft 65 beyond ear 66 there is a gear 69 which meshes with a gear segment 70 pivoted at 71. A rod 72 connects gear segment 70 with a lever 73 which in turn is connected to a rod 74 operating through a guideway 75. On the end of rod 75 there is an abutment 76 and a spring 77 is located around the rod between abutment 76 and guide 75. In line with rod 74 there is a casing 78 within which there is provided yielding means for a rod 79 located in the path of abutment 76. It will be seen that spring 77 normally thrusts rod 74 to the left, as viewed in Fig. 1, as far as it is allowed to move by its connections, but when the end of rod 74 encounters rod 79 rod 74 is stopped.

Mounted transversely of the ram there is a shaft 80 having arms 81 upon which a cutter 82 is carried. An arm 83 extending upward from rock shaft 80 is connected by a link 84 to an arm 85 which in turn is rigid with an arm 86 connected by a link 87 to a bell crank lever 88. Link 87 is provided with a yielding connection 89. Bell crank lever 88 is provided with a roller 90 operating in cam track 91 in cam plate 25.

Immediately above the gathering mold there is a suction head 94 having therein a cavity 95. A valve 96, normally held closed by a spring 97, controls the connection between cavity 95 and a passage 98 through the vacuum head and ram to a source of vacuum. The stem of valve 96 is operated by a tappet arm 99 pivoted at 100. On pivot 100 there is an arm 101 connected by a link 102 to an arm 103 on a rock shaft 104. A spring 105, also connected to arm 103, normally rocks the parts so as to raise the tappet from contact with the stem of the valve. Rock shaft 104 is provided with an actuating arm 106 which is connected by a link 107 to a lever 108 carrying a roller 109 which is adapted to contact an abutment above the path of the ram and actuate the lever and, through its connections, open the valve at proper intervals, as will be readily understood.

In cap 67 of the gathering mold there is mounted a central plug 111, and grooves 112 are provided through the edges of this plug so as to form vacuum ducts connecting cavity 95 with the cavity 110 within the mold. Cap 67 is likewise provided with ducts 113 which connect chamber 95 with a groove 114 in the top of mold 45. Ducts 115 lead from groove 114 through the wall of the mold to a groove 116 in the bottom of the mold. When in gathering position, face 117 of cutter 82 fits against the bottom of the mold and closes the bottom of groove 116. In this position an opening 118 through the cutter registers with the bottom of cavity 110 in the mold. Surrounding the upper end of opening 118 immediately next to the bottom of the mold there is a cutter ring 119.

The exterior of cap 67 is provided with a groove 120 in which there fits loosely a plate 121 mounted on the cap carrying the ring 122. Similarly, mold 45 is provided with a groove 123 in which there fits loosely a plate 124 mounted on the mold carrier 125. This mounting allows play of the cap and mold so that they may be automatically fitted against the suction head and against each other. Upon the cutter carrying arm there is a lug 126 through which there is a set screw 127 adapted to contact an abutment 128 on the cap when the parts are in gathering position. By proper adjustment of this set screw a close fit of the parts in this position is insured. Mold carrier 125 is provided with a pin 129 which enters a groove 130 in mold 45 so as to maintain horseshoe shaped groove 116 in proper position.

The operation of the device will be fairly apparent from the foregoing description, but for convenience will be summarized as follows:

At proper intervals the ram is thrust outward by operation of cam 41 so that the gathering head is placed within a tank 131 and in contact with the molten glass 132 therein. At the same time vacuum valve 96 is operated to evacuate chamber 95. Thereupon cavity 110 is evacuated through grooves 112 and the glass is sucked up into the cavity of the mold, forming a gather 133. Immediately after the gathering operation is completed, cam 41 operates to start the withdrawal of the ram. Thereupon cam 25 operates the cutter to cut off the glass 134 in opening 118, as shown in Fig. 8. Vacuum connections are maintained during this operation and, since cavity 95 is connected with groove 116 with which surface 117 of the cutter contacts, the cutter is held by suction in close contact with the underface of the mold, so that cutter ring 119 makes a clean cut against the bottom of the mold, shearing off the glass smoothly. Thereafter cam 25 operates to swing the cutter to the position in which it is shown in Fig. 9 and maintains it there until the ram is once more thrust into gathering position.

When the ram is withdrawn far enough so that roller 60 enters the upwardly slanting portion 135 of cam groove 61, sleeve 47 begins to oscillate and continues this motion until the gathering mold is swung to the position in which it is shown in Fig. 10, resting against a discharge head 136. Discharge head 136 has in its bottom a relief cavity 137, a little larger than the opening in the end of the mold, so as to effectually prevent any cooling contact between the discharge head and the glass in the mold. Extending upward from cavity 137 there is a passage 138 which is connected to a pipe 139 which may supply compressed air, if desired.

Figure 9:
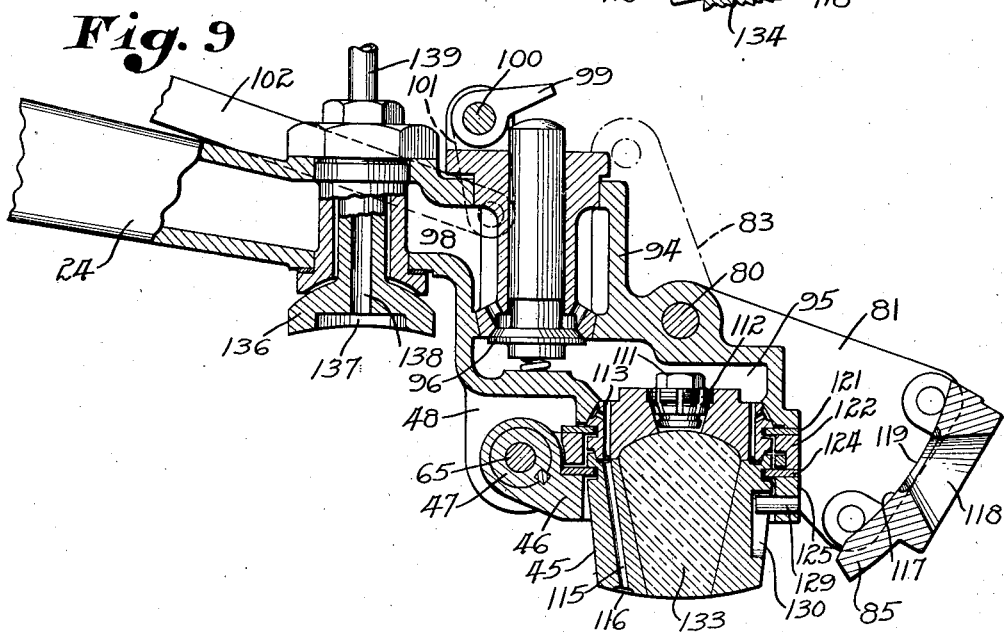

During the swinging of the mold from the position in which it is shown in Fig. 9 to that in which it is shown in Fig. 10, spring 77 maintains the cap in close contact with the mold. Continued movement of the ram, after the parts reached the position in which they are shown in Fig. 10, brings rod 74 in contact with rod 79 and thereby swings cap 67 back to the position in which it is shown in Fig. 11.

Inasmuch as the walls of cavity 110 are so shaped that they expand downwardly in this position, the glass normally drops from the mold without difficulty and passes through a suitable guide 140 to any desired shaping apparatus. However, the glass clings sufficiently so that it does not fall until cap 67 is given ample time to move out of the way thereof. If for any reason it is desired to shape the gather of glass so that it will not drop promptly from the gathering mold as soon as the cap is swung out of supporting position, air may be admitted through the discharge head to blow the glass from the gathering mold, and the same operation may be used if it is desired to impart added momentum to the glass so that it will enter the shaping mold with sufficient force to conform to the bottom of the mold.

When the ram is again thrust outward from the position in which it is shown in Fig. 12, rod 74 moves out of contact with rod 79 and spring 77 thereupon swings the cap up to the position in which it is shown in Fig. 13. Thereafter continued movement of the ram moves roller 60 through cam track 135 and returns the gathering mold to the position in which it is shown in Fig. 14. The final movement of the ram to position over the glass moves the cutter down to the position in which it is shown in Fig. 7, and opens the vacuum valve, whereupon the gathering operation is repeated.

It will be readily understood from the foregoing description that the method devised results in sucking up a gather of glass into an accurate measuring mold and shearing the glass smoothly across the end of the mold, so that exactly the same amount of glass is gathered each time. Thereafter the gather is turned over and is discharged downwardly into or upon shaping devices, with the severed end of the gather upward. With the construction shown, the cutting member is held in close shearing contact with the bottom of the mold and is so shaped and operated that it may be at a fairly high temperature so, that the chilling action of the cutter is not great. Still there is apt to be some scar left upon the gather, and for some purposes it is advantageous to have this scar on the upper end of the gather when the gather is deposited upon the final shaping apparatus. By reversing the position of the gathering mold between the time when the gather is made and when it is discharged, it is possible to obtain all of the advantages of sucking the glass up into a gathering mold and accurately measuring it therein while at the same time discharging the gather downward with any shear mark, which may be formed on the upper surface of the gather as thus discharged.

While one operative form of apparatus for carrying out the invention has been disclosed in detail, it will be readily understood that various changes and modifications can be made within the scope of the appended claims.

What is claimed is:

1. In apparatus for gathering and discharging plastic glass, a ram carrying a glass gathering device, means for reciprocating the ram to carry the gathering device into and out of a furnace, said gathering device comprising a blank mold and means to suck glass into the mold through an opening in the bottom thereof, means to cut off the glass below the bottom of the mold while the mold is vertically disposed, and means to invert the mold and discharge the gather therefrom downward through what is the top of the mold during the filling thereof.

2. Gathering apparatus comprising a ram, a blank mold carried by the ram and open at its two ends, means for reciprocating the ram to carry the blank mold into and out of a glass container, a cover for the mold having passages therethrough into the cavity of the mold, there being a vacuum chamber in the ram against which the cover fits when the mold is in gathering position, a pivotal mounting for the mold, a pivotal mounting for the cover, means for swinging the mold and cover together about said pivots from gathering position to an inverted position and means for separately swinging said cover away from the mold when the mold is in inverted position.

3. Gathering apparatus comprising a ram, a mold carried by the ram and open at its two ends, means for reciprocating the ram to carry the blank molding into and out of a glass container, a cover for the mold having passages therethrough into the cavity of the mold, there being a vacuum chamber in the ram against which the cover fits when the mold is in gathering position, a pivotal mounting for the mold, a pivotal mounting for the cover, means for swinging the mold and cover together about said pivots from gathering position to an inverted position, means for separately swinging said cover away from the mold when the mold is in inverted position, spring means normally holding the cover in contact with the mold, an abutment in the path of said spring means when the ram is moved to carry the mold out of the glass container, the spring being arranged so that it is compressed when the spring means encounters said abutment, and means forming a part of said spring means and forcibly swinging the cover to open position when actuated by relative movement of the ram and abutment.

4. Apparatus for gathering glass comprising a ram, a blank mold carried by the ram, means for reciprocating the ram into and out of a glass receptacle, means for cutting off the glass against the bottom of the blank mold as it leaves the receptacle, means for applying vacuum to the top of the mold while in the receptacle and during the cutting operation, means for inverting the blank mold while it is moving away from the receptacle, and means for opening the blank mold to discharge the glass therefrom as the ram reaches the limit of its travel away from the receptacle.

5. A method of gathering glass which comprises sucking glass from the surface of a pool into a cavity of definite size, shearing the glass in the cavity from that in the pool across the bottom of the cavity, withdrawing the glass in the gathering mold containing said cavity from the receptacle containing the glass and inverting the mold over shaping means, opening the mold and discharging the gathered blank downward with the sheared portion on top as it moves to the shaping means.

6. A method of gathering glass which comprises sucking glass from the surface of a pool into a cavity of definite size, said cavity having a cross-section above its inlet greater than the cross-section of the inlet, shearing the glass in the cavity from that in the pool across the bottom of the cavity, withdrawing the glass in the gathering mold containing said cavity from the receptacle containing the glass, inverting the mold over shaping means, opening the mold along an approximately horizontal line at approximately the greatest horizontal cross-section of the mold and discharging the gathered blank downward with the sheared portion on top as it moves to the shaping means.

HAROLD R. SCHUTZ.